United States Patent [19]
Brockmann et al.

[11] Patent Number: 5,257,356
[45] Date of Patent: Oct. 26, 1993

[54] METHOD OF REDUCING WASTED BUS BANDWIDTH DUE TO SLOW RESPONDING SLAVES IN A MULTIPROCESSOR COMPUTER SYSTEM

[75] Inventors: Russell C. Brockmann; William S. Jaffe; Leith Johnson, all of Fort Collins, Colo.

[73] Assignee: Hewlett-Packard Company, Palo Alto, Calif.

[21] Appl. No.: 705,873

[22] Filed: May 28, 1991

[51] Int. Cl.$^5$ .................................... G06F 13/36
[52] U.S. Cl. ............................ 395/725; 395/325; 364/230.4; 364/242.92; 364/DIG. 1; 364/931.44; 364/942.4; 364/937.01; 364/940.2; 364/DIG. 2
[58] Field of Search ............ 395/725, 325, 200; 364/230.4, 242.92, DIG. 1, 931.44, 942.4, 937.01, 940.2, DIG. 2

[56] References Cited
U.S. PATENT DOCUMENTS 4,602,327 7/1986 LaViolette et al. .............. 395/325
4,706,190 11/1987 Bomba et al. .................... 395/325
4,785,394 11/1988 Fischer ............................ 395/325
4,817,037 3/1989 Hoffman et al. .................. 395/325
5,101,479 3/1992 Baker et al. ...................... 395/325

Primary Examiner—Michael R. Fleming
Assistant Examiner—Glenn A. Auve

[57] ABSTRACT

In a multiprocessor computer system, wasted bus bandwidth resulting from slow responding slaves is reduced by relinquishing the master that was busied by the slow responding slave, and then causing the slave to effectively arbitrate for bus control on the relinquished master's behalf when the slow responding slave is either available to service the master or has the requested data. In accordance with the disclosed embodiment, the slave effectively arbitrates for bus control on the relinquished master's behalf by placing a unique arbitration code associated with the relinquished master on the bus. The relinquished master detects the presence of its arbitration code and then again arbitrates for bus control so that it may communicate with the slow responding slave.

15 Claims, 2 Drawing Sheets

METHOD OF REDUCING WASTED BUS BANDWIDTH DUE TO SLOW RESPONDING SLAVES IN A MULTIPROCESSOR COMPUTER SYSTEM

FIELD OF THE INVENTION

The present invention relates generally to multiprocessor computer systems. More particularly, the present invention relates to a method for reducing wasted bus bandwidth resulting from slow responding slaves in a multiprocessor computer system.

BACKGROUND OF THE INVENTION

Multiprocessor, shared resource computer systems are commonly employed where high speed throughput is required. Typically, such systems are characterized by a plurality of processors, which function as masters, and share a common bus. A plurality of input/output devices, which function as slaves, also share the common bus so that the masters and slaves may communicate with one another in well known fashion. Such a system is illustrated in simplified form in FIG. 1 wherein the masters are depicted by the blocks labeled M0, M1, etc. and the slaves are depicted by the blocks labeled S1, S2, etc. Since only one master and one slave may communicate with each other at any given point in time, it is common for such systems to employ some technique where the masters compete among themselves for bus control. An arbitration technique is usually employed for determining which master should control the bus during any given data cycle. Typically, an arbitration circuit employing some type of arbitration method determines which master should control the bus next. Various arbitration methods are known which award bus control based on, for example, assigned priority of each competing master, each master's previous bus usage level, or based upon a round-robin technique, to name but a few. Irrespective of the particular arbitration method employed, a problem arises when the slave selected by the master to perform a certain task is either busy or slow to respond. Typically, the slave informs the master having control of the bus of this situation. In the art, this situation is generally referred to as either a "busy", or a "wait". It is said that the slave either "busies the transaction" or "waits the transaction", since the process of the master requesting service from the slave and communicating with the slave to retrieve data is known as a "transaction."

There are at least two reasons why a slave may busy a transaction. First, the slave may be slow in performing the required transactions. Here, slow is a relative term. In some systems, slow may mean several microseconds, and in others, a few hundred nanoseconds. Second, a slave may be busy doing something else, or may not have any additional resources to devote to the incoming transaction, and therefore be unable to respond to the master immediately.

One known method of handling busy and/or slow responding slaves in the prior art is for the master having bus control ("winning master") to hold control of the bus until the slave has performed the service requested by the winning master and has provided the resulting data. In another known method, the slave raises a flag when it is busy, and the winning master holds control of the bus and polls the slave until it becomes available. The winning master then maintains control of the bus until the slave has completed the requested service. It will be appreciated that the time spent for the winning master waiting for the slave to either become available or finish its task represents unproductive time insofar as bus usage and sharing of system resources are concerned. Thus, these methods waste bus bandwidth since other masters could gainfully employ the bus, but for the action of the winning master in waiting for the slave.

In still another known method, once a master has been busied, it releases the bus. The master then rearbitrates for bus control, and if the slave that it is attempting to access is busy, the master again releases the bus and must later rearbitrate for the bus and again attempt to access the slave. This method suffers from the need to assure forward progress, i.e., that all requests will eventually be serviced, otherwise deadlock and/or starvation may occur. In addition, this method suffers from an essentially unlimited upper bound on the number of "wasted" transactions that are issued until the slave is able to respond.

In yet another known method, the bus is freed by the winning master after service has been requested from the slave, and interrupts are employed to signal this master that the slave is either ready or has completed its task. While this method overcomes the drawbacks of the first two methods described above, it suffers from the same drawback of the third method described above. Moreover, it may require the use of process swaps or may require several interrupt lines on the bus. It may also require the use of polling by the master to determine which slave interrupted the master. Thus, this method is expensive not only in the resources that must be allocated to service the interrupt, but also in terms of the time required to effect process swaps and/or determine which slave caused the interrupt. Moreover, this method may add overhead to the system since it requires combining arbitration and interrupt driven methodologies.

There is yet another known method, known as a "split transaction", wherein the master issues a request for service and at a later indeterminate time, the slave responds with the requested service by issuing a "return" transaction. This method still doesn't solve the "busy" case, and also requires the slave to be able to "master" transactions.

There is therefore a need in the art for a method of reducing the amount of wasted bandwidth resulting from slow responding slaves, and which overcomes all of the foregoing problems of the prior art, yet is simple and relatively inexpensive to implement. The present invention achieves these goals.

SUMMARY OF THE INVENTION

The present invention is for particular use in a computer system having a plurality of master devices (masters) that communicate with a plurality of slave devices (slaves) over a shared bus. The masters having operations to be conducted by slaves arbitrate to win bus control to permit a winning master to communicate with a selected one of the slaves, as is common. Any arbitration method may be employed. According to the invention, the selected slave signals the winning master that it should relinquish control of the bus when the selected slave is either unavailable to service a request issued by the winning master, or is unable to complete the requested service within a calculated or predetermined period of time. In response, the winning master relinquishes control of the bus, and for definitional purposes only, is defined thereafter as a "relinquished master." The relinquished master is thereafter inhibited from arbitrating for bus control except as set forth below. When the selected slave either becomes available to service the request previously issued by the relinquished master, or has completed the requested service, it arbitrates for bus control on the relinquished master's behalf. According to the disclosed embodiment of the invention, this step is performed by storing, at the selected slave, a unique arbitration code associated with the relinquished master, and placing the relinquished master's arbitration code on the bus. The relinquished master, upon detecting that its arbitration code has been placed on the bus, begins arbitrating with the other masters for bus control. Upon obtaining bus control, the relinquished master (which is now the winning master) reissues to the selected slave the request that it had previously issued that resulted in the slave returning a "busy".

As mentioned, the relinquished master is inhibited from arbitrating with the other masters for bus control until it has detected the presence of its arbitration code on the bus (as placed thereon by the slave). However, according to one embodiment of the invention, the relinquished master is permitted to arbitrate for bus control if the slave has not placed the relinquished master's arbitration code on the bus within a selected period of time.

According to yet a further embodiment of the invention, when a selected slave is busy servicing a request issued by a winning master, and when the bus is available for arbitration by other masters, the selected slave performs the following additional steps when another master subsequently wins bus control and issues a request to the busy selected slave: first, the selected slave maintains a record of the arbitration code of each other master issuing a request; then, second, the selected slave performs the steps set forth above for each of the other winning masters according to record maintained by the busy selected slave.

Other aspects and advantages of the invention will become apparent from the following detailed description of the preferred embodiment of the invention.

DETAILED DESCRIPTION OF THE PREFERRED EMBODIMENT

Figure 1:
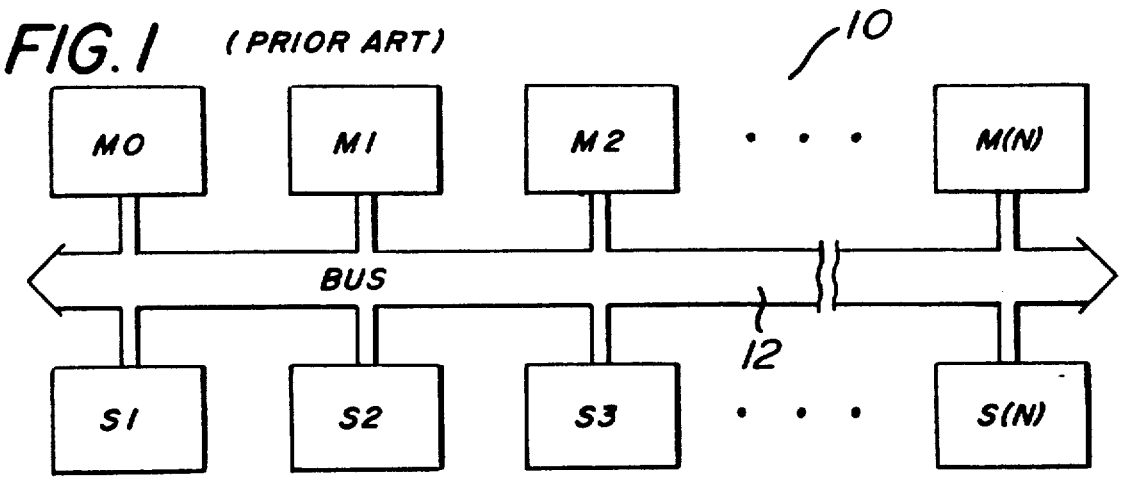
FIG. 1 is a simplified depiction of the structure of a conventional multiprocessor, shared resource computer system having a plurality of masters and slaves.

Referring now to the drawings wherein like numerals represent like elements, there is illustrated in FIG. 1 a conventional, multiprocessor, computer architecture 10 having a plurality of master devices M0-M(N) that communicate with a plurality of slave devices S1-S(N) over a shared bus 12. The bus 12 is preferably a synchronous bus. Each of the masters M0-M(N) competes with all of the other masters, via an arbitration state machine (40) (See FIG. 4), for control of the bus 12. Note that the masters M0-M(N) may also function as slaves. As is common, when one of the masters obtains bus control, it requests service from a selected one of the slaves S1-S(N). By way of example, the slaves may be memory or input/output devices, or any other device, but the present invention has particular application to slow responding input/output devices. As is common, when one of the masters obtains bus control, it monopolizes the bus to issue a request for service to, and communicate with, the selected one of the slaves during the time that it has obtained bus control. According to one preferred embodiment, the invention is employed in connection with a least recently used, or distributed priority list, arbitration technique. See, for example, copending U.S. application Ser. No. 07/694,265, entitled "Quadrature Bus Protocol for Carrying Out Transactions in a Computer System".

Figure 2:
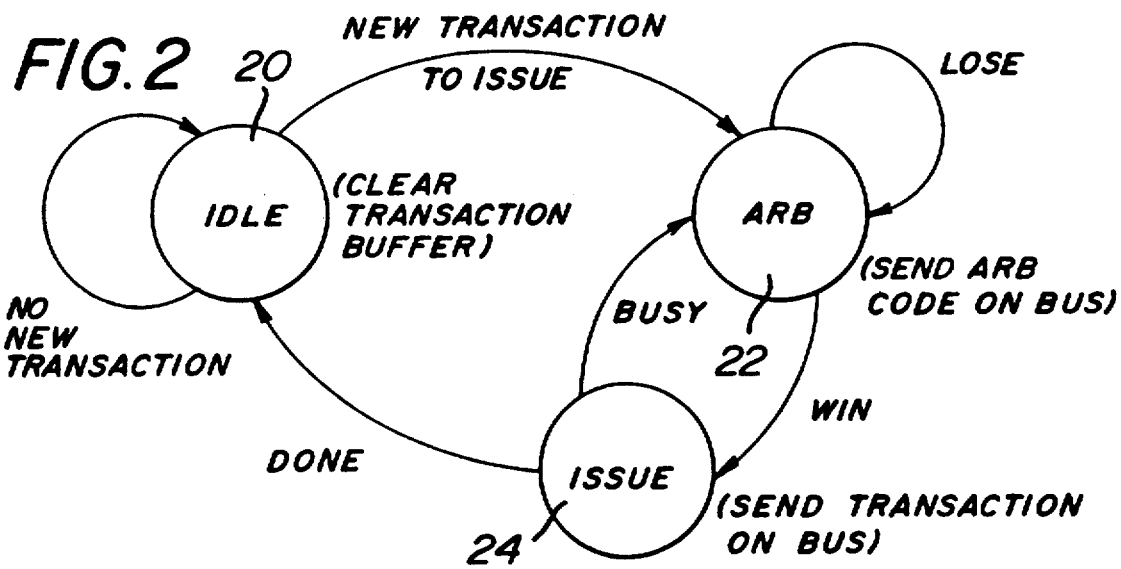
FIG. 2 is a state diagram illustrating, in relevant part, the operation of each master processor in a multiprocessor computer system according to the invention.
Figure 3:
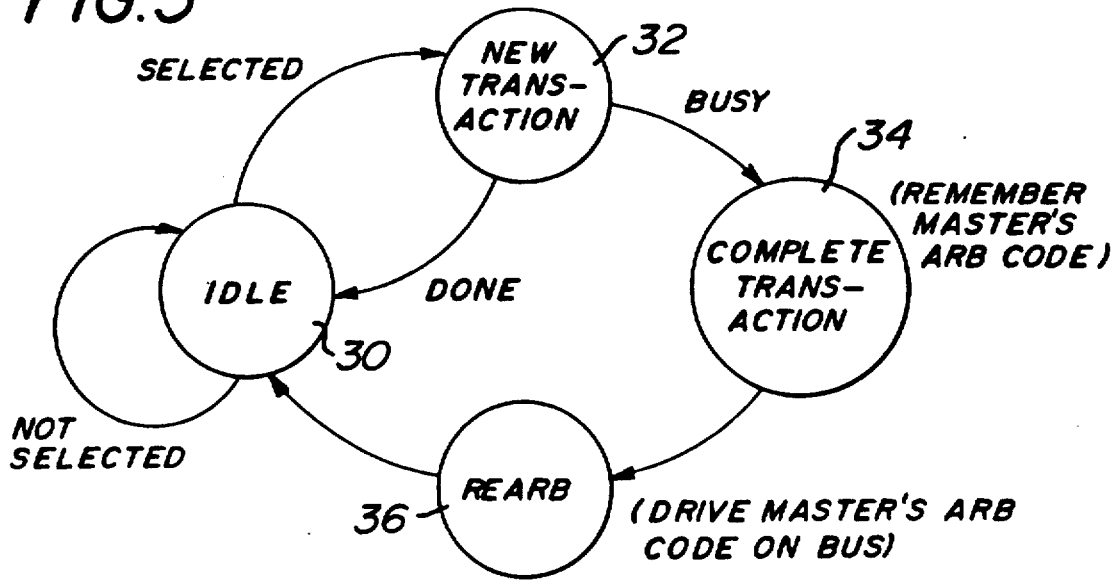
FIG. 3 is a state diagram illustrating, in relevant part, the operation of each slave in a multiprocessor computer system according to the present invention.
Figure 4:
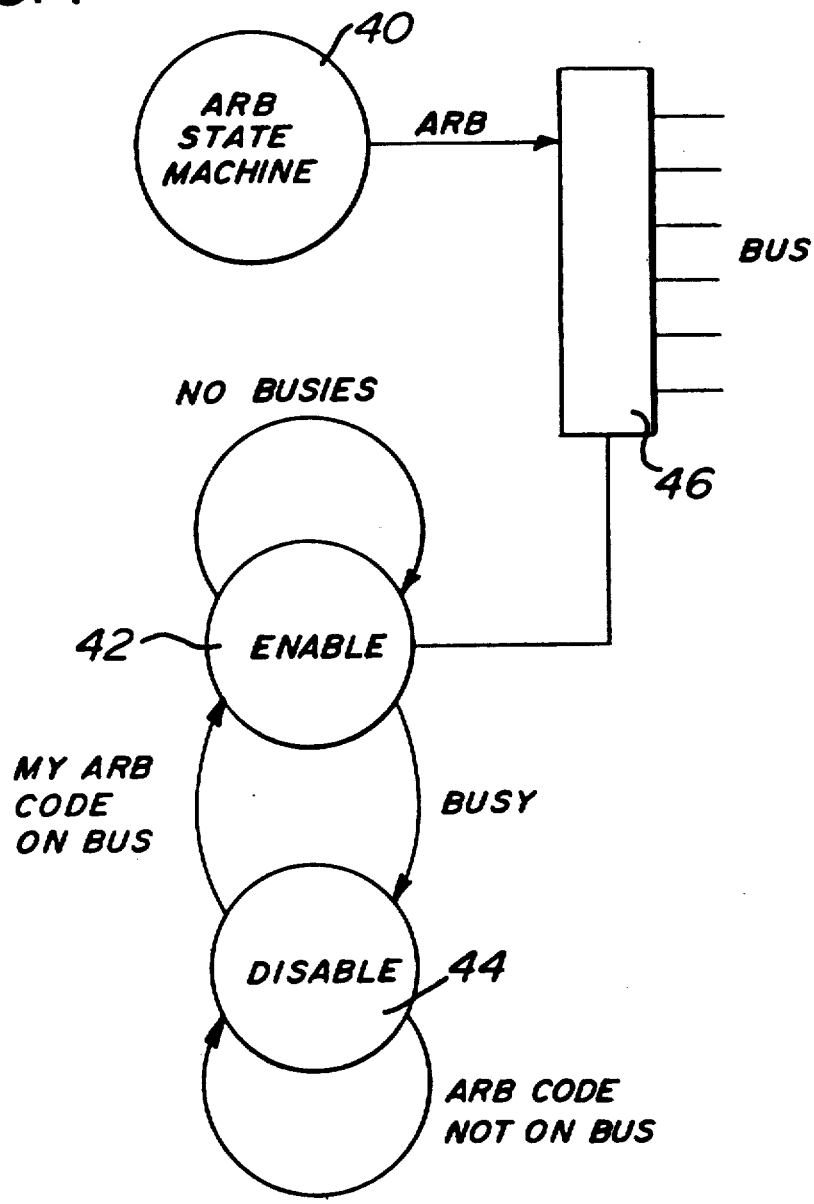
FIG. 4 is a state diagram illustrating, in relevant part, further details of the operation of each master in a multiprocessor system according to the present invention.

The method of the present invention is illustrated in detail in the state diagrams of FIGS. 2-4. Generally, the method of the present invention ensures that no winning master will monopolize the bus by waiting for the selected slave either when the selected slave is busy fulfilling a previous request for service from another master, or when the selective slave cannot timely provide the requested service, by operating in accordance with the following steps illustrated in FIGS. 2-4:

(a) causing the selected slave to signal the winning master that the winning master should relinquish bus control when the selected slave is either busy or unable to service the request from the winning master within a first period of time, and storing a unique arbitration code associated with the winning master in a memory register (not shown) of the selected slave;

(b) causing the winning master to relinquish bus control in response to the signal from step (a), then redefining the winning master as a relinquished master and inhibiting the relinquished master from subsequently arbitrating with other masters for bus control except after expiry of a second period of time after the relinquished master has relinquished bus control;

(c) causing the selected slave to issue the relinquished master's arbitration code on the bus when the selected slave either becomes available to provide the service previously requested by the relinquished master or has completed the service previously requested by the relinquished master. In this latter step, the selected slave first reserves resources for servicing the request issued by the winning master if the selected slave had provided the signal in step (a) as a result of being busy servicing another request;

(d) causing the relinquished master to detect the presence of its arbitration code on the bus and, in response, causing the relinquished master to arbitrate with the other masters for bus control even if the second period of time has not expired. In this step, the relinquished master, upon obtaining bus control, reissues to the selected slave the same request for service requested before the winning master became the relinquished master. Note that the relinquished master may win the bus on its first attempt. In the preferred embodiment, the act of the slave placing the arbitration code of the master on the bus is an actual arbitration cycle of the master, and the master can win bus control during this arbitration cycle without ever physically having to reissue its arbitration code on the bus. Thus, if the master recognizes its arbitration code on the bus, it takes over the arbitration cycle as if it had actually arbitrated during the current cycle, and continues to arbitrate if necessary until it wins;

(e) causing the selected slave to carry out the service requested in step (d); and, (f) causing the selected slave, when busy servicing the request previously issued by the winning master, and when the bus is available for arbitration by other masters, to perform the following steps when another master subsequently wins bus control and issues a request to the busy selected slave:

(i) maintaining at the slave a record of the arbitration code of each master issuing a request (see FIG. 5); and, (ii) performing steps (a) through (e) above for each other winning master according to the record maintained at the busy selected slave.

Thus, in-between the occurrence of steps (c) and (d), the bus is available for communication between other masters and slaves during times that the selected slaves are busy or cannot service requests within the first predetermined period of time. The winning master is relinquished because the selected slave cannot service the request within the first predetermined period of time, then, when the relinquished master again obtains bus control, the selected slave will have the requested data available for sending to the relinquished master when it again obtains bus control.

FIG. 2 is a state diagram illustrating the present invention as carried out by each of the masters M0-M(N). Prior to requesting bus control, a particular master is in the idle state 20 and remains there as long as it does not need to issue any new transactions. However, when a particular master needs to issue a new transaction, it enters an arbitration state 22 where it actively arbitrates for bus control. Typically, an arbitration state machine 40 (FIG. 4) determines which master will next obtain bus control. When a master wins bus control, it issues its transaction on the bus, as shown at state 24. The master maintains bus control for as long as it takes to issue the transaction. When the transaction is complete, the slave with which the master is communicating (i.e., the selected slave) will indicate that it is either busy, or that it has completed the transaction. This is set forth in more detail in FIG. 3. If the selective slave returned a "busy", then the master that won bus control (the winning master) is relinquished and inhibited from arbitrating for the bus until some future time, as discussed below. Typically, a slave will issue a "busy", when it is either busy performing another transaction and cannot service the transaction, or request, issued by the master, or, the slave is slow and cannot complete the requested service within a predetermined period of time. As illustrated in FIG. 2, if the slave was available to perform the requested service, and the requested service was performed within the predetermined period of time, then the master again enters the idle state 20, where the aforementioned process is repeated.

As is common in some multiprocessor computer systems employing an arbitration scheme, each master has associated therewith a unique arbitration code. According to the invention, when a winning master is relinquished as a result of the selected slave returning a "busy" in response to a service request, the relinquished master is inhibited from again arbitrating for bus control until the selected slave has placed the relinquished master's arbitration code on the bus. This is explained in more detail in FIG. 3. The action of the master during this time is illustrated in FIG. 4. As shown therein, the master, designated 46, is normally enabled, as shown at 42, where it is permitted to arbitrate for bus control. However, if the master issued a transaction and the slave returned a "busy", the master is subsequently disabled, or relinquished, as shown at 44, until the slave places the relinquished master's arbitration code on the bus. As shown, once the relinquished master detects the presence of its arbitration code on the bus, it becomes enabled, as shown at 42, where it again arbitrates for bus control, i.e., it returns to state 22 of FIG. 2.

FIG. 3 illustrates the relevant action of the selected slave when it receives a request for service, i.e., transaction, from the winning master. As shown, the slave is normally in the idle state 30, and remains there until it has received a request for service from the winning master. The slave then enters state 32 where it acknowledges the request for service. If the slave is not busy, and can service the request within the first predetermined period of time, then it performs the requested service and returns to the idle state 30. In such case, the master also transitions from state 24 to state 20. If, however, the selected slave is either busy or cannot complete the requested service within the first predetermined period of time, it enters state 34, where it stores the arbitration code of the winning master and returns a "busy" to the winning master. In such case, the winning master transitions from state 24 to the states illustrated in FIG. 4, previously described, where the winning master becomes relinquished. Once the selected slave becomes available, or has completed the requested service, it drives the master's arbitration code onto the bus and effectively signals the relinquished master that it should begin arbitrating for bus control to again establish communications with the selected slave, as shown at state 36. Note, however, that the action of the slave signalling the master to arbitrate for the bus may result in the master winning bus control in the same cycle.

The response of the winning master is illustrated in FIG. 4, previously described. Once the selected slave has placed the relinquished master's arbitration code on the bus, it enters the idle state 30 until the relinquished master has again won bus control and has again selected the slave so that it may complete the transaction previously requested of the slave. Thus, the selected slave effectively arbitrates for bus control on the relinquished master's behalf. Note that the action of the slave effectively arbitrating on the relinquished master's behalf occurs one time only; thereafter, the master must arbitrate for itself unless the slave won arbitration for the master.

As previously mentioned, it should be noted that the relinquished master may win the bus on its first attempt. It should also be noted that the act of the slave placing the arbitration code of the master on the bus may, in some cases, be an actual arbitration cycle of the master, and that the master can win bus control during this arbitration cycle without ever physically having to reissue its arbitration code on the bus. Thus, if the master recognizes its arbitration code on the bus, it takes over the arbitration cycle as if it had actually arbitrated during the current cycle, and continues to arbitrate if necessary until it wins.

It should be appreciated from the foregoing that the arbitration state machine continues to re-arbitrate for the bus while the slave is busy, but since its arbitration code is inhibited from being driven onto the bus, it cannot win bus control. The arbitration state machine may not be aware that its code has been inhibited from being driven on the bus, because it will continue to arbitrate until it wins. Since, the arbitration state machine "thinks" that it is actually arbitrating, the slave can win on its behalf and there is no start-up penalty to restart arbitration.

In the foregoing description, separate state machines were used for arbitrating and enabling the arbitration codes to be sent on the bus. However, it should be understood that this represents only the preferred embodiment and that the invention is not limited thereto. Moreover, it should be understood that the state machines don't necessarily have one to one correspondence to actual machine or bus states.

According to a most preferred embodiment of the invention, if the relinquished master does not detect the presence of its arbitration code on the bus within a second predetermined period of time after it has relinquished bus control, then it is enabled and becomes available to arbitrate for bus control irrespective of the selected slave's status. In other words, the master transitions from state 44 to state 42 (FIG. 4) once the second predetermined period of time has expired without its arbitration code appearing on the bus.

According to another embodiment of the invention, there is provided a method for ensuring "forward progress" of each transaction for which a slave has signalled a "busy" to a master. It is possible for a busy slave to receive requests for service from other masters while it is servicing the request from a winning master, or even from a relinquished master. According to the invention, as requests for service come into the slave from other masters, the slave "busies" those masters, but maintains a record of the identity of each of the other masters (i.e., their arbitration codes). These identities may be a single bit in a storage register or other code. When the slave becomes available, it employs this record to determine which master it should next service, and places that master's arbitration code on the bus so as to enable the master to perform the steps illustrated in FIGS. 2 and 4 to arbitrate for the bus and communicate with the selected slave.

Figure 5:
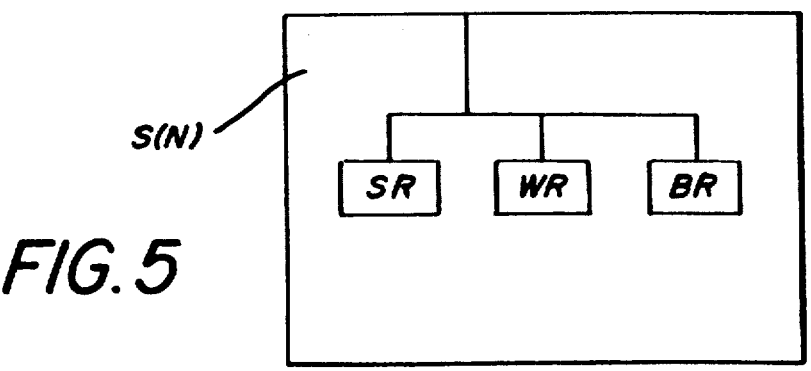
FIG. 5 is a simplified block diagram illustrating the implementation of a "snapshot register" (SR) and "working register" (WR) in each slave according to the practice of one embodiment of the present invention.

According to one implementation shown in FIG. 5, each slave may have: a snapshot memory element SR (such as a queue or register) that is used to record codes of masters arbitrating for the slave while it is too busy to respond to new requests; a busy memory element BR that stores the master arbitration codes for which the slave has allocated resources to complete a transaction; and a working memory element WR that transfers, one master code at a time, to the BR, and, when empty, updates itself from the SR, then clears the SR. The BR entry or entries are only zeroed or cleared when the transaction has been completed. It should be noted that multiple BR entries may be maintained. Thus, a slave with sufficient resources might be servicing multiple masters at once before busying other masters due to an inability to service them. The BR entries are placed on the bus either when a device whose code is stored in the BR becomes available or when a transaction that was previously busied is completed. The slave may respond to any master as appropriate if one or more BR entries are empty; it must only guarantee that, once a master's code has been entered in the BR, the slave must not eliminate that entry or its associated resources until the transaction has been completed. Thus, the slave must guarantee that when it rearbitrates for a master, it has allocated enough resources to complete any transaction issued by the master.

The masters are re-started (enabled) one at a time in a system determined order. The order may be: the order in which the arbitration requests were received; a random order; a system defined master order; etc. A slave is permitted to discard any resource saved for a master that fails to reissue a transaction within a third predetermined time period.

There has been described a method for ensuring that no winning master monopolizes the bus while waiting for a busy or slow responding slave, so that other masters may utilize the bus during the time that the winning master would otherwise monopolize it. Since the arbitration codes will usually already be present in systems in which the invention might be employed, no extra signal lines, such as used in interrupt schemes, are required. Many changes, modifications, variations and other uses and applications of the subject invention will, however, become apparent to those skilled in the art after considering this specification and accompanying drawings which disclose preferred embodiments thereof. All such changes, modifications, variations and other uses and applications which do not depart from the spirit and scope of the invention are deemed to be covered by the invention which is limited only by the claims which follow.

We claim:

1. In a computer system having a plurality of master devices (masters) that communicate with a plurality of slave devices (slaves) over a shared bus, and wherein masters having operations to be conducted by slaves arbitrate to win bus control to permit a winning master to communicate with a selected one of the slaves, a method of reducing wasted bus bandwidth resulting from slow responding slaves, said method comprising the steps of:

a) issuing from the winning master to the selected slave a request for service to be performed by the selected slave;

b) signalling the winning master from the selected slave, when the selected slave is either unavailable to service the request or unable to complete the request within a first predetermined time period, that the winning master should relinquish control of the bus;

c) relinquishing control of the bus from the winning master in response to the signalling from step (b), the winning master becoming a relinquished master;

d) arbitrating for bus control at the selected slave, on the relinquished master's behalf, when the selected slave either becomes available to service the request issued in step (a) or has completed the request issued in step (a); and, e) detecting at the relinquished master that the selected slave has arbitrated for bus control on the relinquished master's behalf, and, in response, arbitrating for bus control at the relinquished master, the relinquished master, upon obtaining bus control, reissuing to the selected slave the request previously issued in step (a);

the bus thereby being available for communications between other masters and slaves during times that selected slaves are busy or cannot service requests within the first predetermined time period.

2. Method according to claim 1 wherein each master is assigned a unique arbitration code and step (b) further comprises storing the arbitration code of the winning master at the selected slave when the selected slave is either unavailable to service the request or unable to complete the request within the first predetermined time period.

3. Method according to claim 2 wherein step (d) comprises issuing on the bus, from the selected slave, the arbitration code of the relinquished master.

4. Method according to claim 2 wherein, when a selected slave is busy servicing a request issued by a winning master, the following steps are performed when another winning master subsequently issues a request to the busy selected slave:
  (i) maintaining at the selected slave a record of the identity of each other winning master issuing a request;
  (ii) performing steps (b) through (e) for each other winning master according to the record maintained at the busy slave.

5. Method according to claim 1 wherein the selected slave reserves resources for servicing the request issued by the winning master in step (a) prior to performing step (d).

6. Method according to claim 1 wherein the request issued in step (a) is a data request, the selected slave having the requested data available for sending to the relinquished master prior to performing step (d).

7. Method according to claim 1 wherein step (c) further comprises inhibiting the relinquished master from arbitrating for bus control until the selected slave has performed step (d).

8. Method according to claim 7 wherein after being inhibited in step (c) from arbitrating for bus control, the relinquished master is again permitted to arbitrate for bus control only if either the selected slave has not arbitrated for bus control on the master's behalf within a second predetermined time period or the selected slave has performed step (d).

9. Method according to claim 1 wherein the computer system is a multiprocessor system and each master is a processor and each slave is an input/output device.

10. Method according to claim 1 wherein the bus is a synchronous bus.

11. In a computer system having plural master processors (masters) that compete for control of a common, synchronous bus via an arbitration scheme for requesting service from one of a plurality of shared input/output slave devices (slaves) connected to the bus, each master having a unique arbitration code assigned thereto, and wherein a winning master monopolizes the bus to issue a request for service to and communicate with a selected one of the slaves during the time that the winning master has obtained bus control, a method of ensuring that no winning master monopolizes the bus by waiting for the selected slave when the selected slave is busy fulfilling a previous request for service from another master or when the selected slave cannot timely provide the request, said method comprising the steps of:

a) causing the selected slave to signal the winning master that the winning master should relinquish bus control when the selected slave is busy or incapable of fulfilling a request for service from the wining master within a first period of time, and storing the winning master's arbitration code in the selected slave;

b) causing the winning master to relinquish control of the bus in response to the signal from step (a), redefining the winning master as a relinquished master, and inhibiting the relinquished master from subsequently arbitrating with other masters for bus control;

c) causing the selected slave to issue the relinquished master's arbitration code on the bus when the selected slave either becomes available to provide the service previously requested by the relinquished master or has completed the service previously requested by the relinquished master;

d) causing the relinquished master to detect the presence of its arbitration code on the bus and, in response, causing the relinquished master to arbitrate with the other masters for bus control, the relinquished master, upon obtaining bus control, reissuing to the selected slave the same request for service requested before the winning master became the relinquished master;

e) causing the selected slave to carry out the service requested in step (d);

whereby, in-between the occurrence of steps (c) and (d) the bus is available for other masters to employ.

12. Method according to claim 11 wherein the relinquished master is inhibited for a second period of time in step (b) but is permitted to arbitrate with other masters for bus control after expiry of the second period of time irrespective of whether the selected slave has issued the relinquished master's arbitration code on the bus.

13. Method according to claim 11 wherein, when the selected slave is busy servicing a request previously issued by the winning master while the bus is available for arbitration by other masters, the following steps are performed when another master subsequently wins bus control and issues a request to the busy selected slave:
  (i) maintaining at the selected slave a record of the arbitration code of each other master issuing a request;
  (ii) performing steps (a) through (e) for each other winning master according to the record maintained at the busy slave.

14. Method according to claim 11 wherein, when the selected salve is busy, the selected slave reserves resources for servicing the request issued by the winning master prior to performing step (c).

15. In a computer system having plural master processors that compete among themselves, via an arbitration state machine, for control of a common, synchronous bus for requesting service from one of a plurality of shared input/output slave devices (slaves) connected to the bus, each master having a unique arbitration code assigned thereto, and wherein a winning master monopolizes the bus to issue a request for service to and communicate with a selected one of the slaves during the time that the winning master has obtained bus control, a method of ensuring that no winning master monopolizes the bus by waiting for the selected slave either when the selected slave is busy fulfilling a previous request for service from another master or when the selected slave cannot timely provide the request, said method comprising the steps of:

a) causing the selected slave to signal the winning master that the wining master should relinquish bus control when the selected slave is either busy or unable to service the request from the winning master within a first period of time, and storing the winning master's arbitration code in a memory register of the selected slave;

b) causing the winning master to relinquish bus control in response to the signal from step (a), redefining the winning master as a relinquished master, and inhibiting the relinquished master from subsequently arbitrating with other masters for bus control except after expiry of a second period of time after the relinquished master has relinquished bus control;

c) causing the selected slave to issue the relinquished master's arbitration code on the bus when the selected slave either becomes available to provide the service previously requested by the relinquished master or has completed the service previously requested by the relinquished master, the selected slave first reserving resources for servicing the request issued by the winning master if the selected slave had provided the signal in step (a) as a result of being busy servicing another request;

d) causing the relinquished master to detect the presence of its arbitration code on the bus and, in response, causing the relinquished master to arbitrate with the other masters for bus control even if the second period of time has not expired, the relinquished master, upon obtaining bus control, reissuing to the selected slave the same request for service requested before the winning master became the relinquished master;

e) causing the selected slave to carry out the service requested in step (d); and, f) causing the selected slave, when busy servicing the request previously issued by the winning master, and when the bus is available for arbitration by other masters, to perform the following steps when another master subsequently wins bus control and issues a request to the busy selected slave:

(i) maintaining at the selected slave a record of the arbitration code of each other master issuing a request; and, (ii) performing steps (a) through (e) for each other winning master according to the record maintained at the busy selected slave;

whereby, in-between the occurrence of steps (c) and (d) the bus is available for communications between other masters and slaves during times that selected slaves are busy or cannot service requests within the first predetermined time period.

* * * * *